March 6, 1951      D. ERNST      2,544,591

KNIFE-EDGE BEARING

Filed March 7, 1945

INVENTOR:
Daniel Ernst
by Sommers & Young
Attorneys

Patented Mar. 6, 1951

2,544,591

UNITED STATES PATENT OFFICE 2,544,591

KNIFE-EDGE BEARING

Daniel Ernst, Zurich, Switzerland, assignor to Maag-Zahnrader und-Maschinen Aktiengesellschaft, Zurich, Switzerland Application March 7, 1945, Serial No. 581,427
In Switzerland January 15, 1944

Section 1, Public Law 690, August 8, 1946
Patent expires January 15, 1964

2 Claims. (Cl. 308—2)

The present invention relates to a knife-edge or fulcrum bearing which is particularly suited for measuring apparatus. The hitherto known knife-edge bearings are provided with a knife-edge resting on a flat supporting face, on which it may be displaced laterally to a small extent so that the turning axis is not definitely located. In order to prevent this lateral displacement notches have been provided in the supporting face adapted to receive the knife-edge. If the cross-section of the notch is curved the lateral guidance obtained thereby is incomplete and swivelling motion of the knife-edge is obtained which is not accurate; if the notch is wedge shaped the knife-edge slides in it and friction and wear results.

The object of the present invention is a knife-edge bearing the knife-edge of which swings always about the same turning axis. To this end each bearing is provided with two knife-edges displaced against each other and the knife-edges of which rest each on a separate supporting face and contact with the latter in the turning axis of the bearing.

Several embodiments of the inventions are illustrated on the accompanying drawing, in which.

Figure 1:
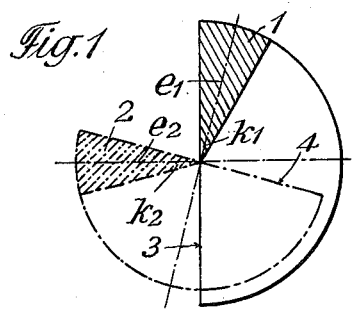
Fig. 1 is a diagrammatic view of a knife-edge bearing having sharp knife-edges.
Figure 2:
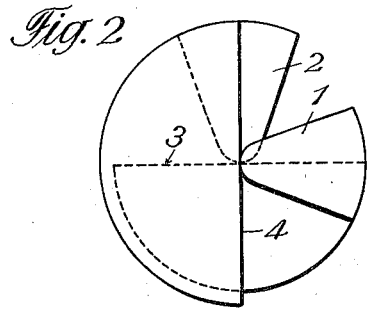
Fig. 2 is a similar view of a knife-edge bearing having rounded off knife-edges.

Referring now to Fig. 1 1 and 2 denote the two knife-edges. Through the edge $k1$ of the knife-edge 1 passes the plane 3 in which lies one plane supporting face for the knife-edge 2 arranged opposite to the knife-edge 1. In this construction the plane 3 coincides with one of the lateral faces of the knife-edge 1 which feature yields the most simple form of the knife-edge body, but which is not essential.

The plane 4 imagined as a prolongation of one of the lateral faces of the knife-edge 2 passes through the edge $k2$ and forms the supporting face of the knife-edge 1. It is preferable, but not essential, that in the middle working position of the knife-edge bearing the bisecting lines $e1$, $e2$ of the angles are at right angles to the planes 4 and 3 respectively. The fact that the two knife-edges $k1$, $k2$ displaced against each other contact with their respective supporting faces 4 and 3 in the line forming the turning axle in which the two planes passing through the supporting faces intersect, ensures that the knife-edge bearing is free of lost motion and swivels almost free of friction about a predetermined and non-changeable turning axis.

Figure 3:
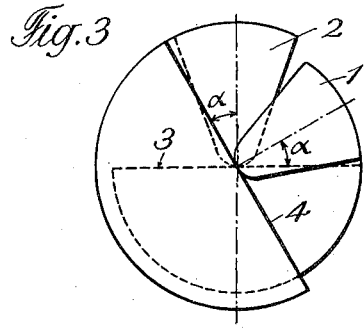
Fig. 3 is a similar view of a knife-edge bearing having oblique supporting faces.

If the device fitted with the knife-edge bearing exerts a considerable pressure on the knife-edges the latter are slightly rounded off in order to reduce the stress, as is shown in Fig. 2. The supporting faces 3 and 4 coincide with the bisecting lines of the knife-edges 1 and 2 but they might also be arranged obliquely to these bisecting lines (Fig. 3).

Figure 4:
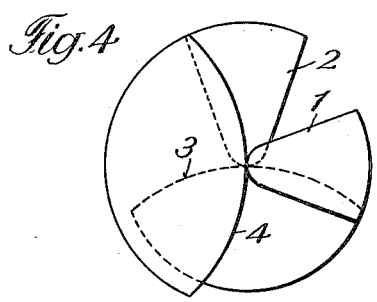
Fig. 4 is a similar view of a knife-edge bearing having curved supporting faces.

Furthermore the supporting faces 3, 4 may also be curved (Fig. 4). In this case two planes tangential to the supporting faces intersect each other in the line forming the turning axis. Knife-edge bearing with rounded edges are suitable for small swivelling angles as frequently occur with measuring apparatus.

Figure 5:
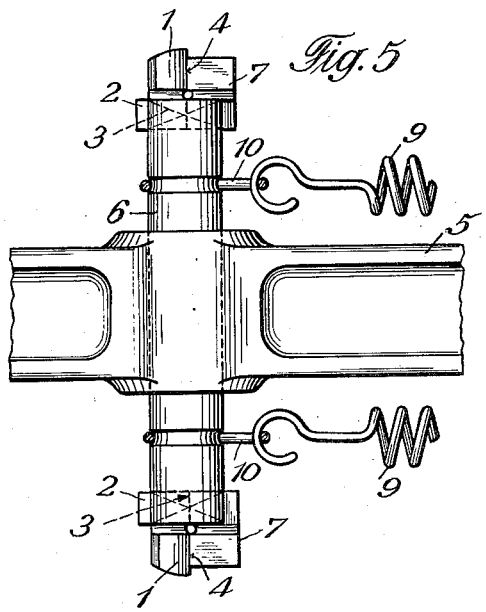
Figs. 5 and 6 show in top view and elevation respectively a knife-edge bearing arrangement.
Figure 6:
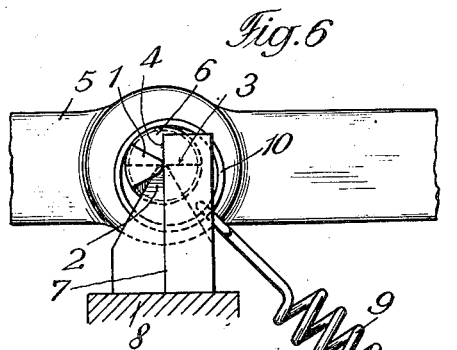
Figure 7:
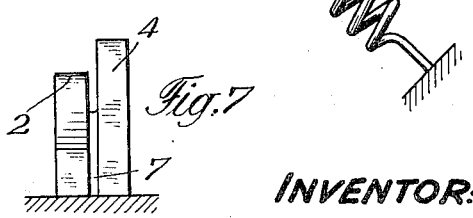
Fig. 7 shows one of the knife-edges and a plane supporting face for the other knife-edge.

Figs. 5–7 illustrate a constructional example of a knife-edge bearing arrangement. The lever 5 of a measuring apparatus is fixed to an axle 6 having both of its ends shaped as a knife-edge 1 of the type shown in Fig. 2. The part of the axle 6 joining to the knife-edge is formed to provide the plane supporting face 3 for the other knife-edge 2. The latter is built in one piece with the supporting face 4 for the first knife-edge 1 (Figs. 6 and 7). The supporting faces 3 and 4 are plane and are again arranged in two planes the intersecting lines of which coincide with the turning axis of the bearing on the left as well as on the right hand side of the lever 5 and form one straight line. In Fig. 6 it is assumed that the weight of the lever 5 rests by means of the supporting faces 3 on the knife-edges 2 arranged on either side of the lever, whilst the knife-edges 1 for guiding and holding the turning axis are pressed against the supporting face 4 of the bearing part 7. This is obtained by the aid of tension springs 9 acting on rings 10 encircling the axle 6. The bearing part 7 on which the device rests, is fixed to a base 8. Obviously the arrangement may be such that the device (lever 5) solely presses by its weight the two pairs of knife-edges against their supporting faces, the springs 9 being dispensed with.

Furthermore the springs may be arranged in the resultant of the two forces causing the knife-edge thrust, in which case the measuring apparatus may be used in any position.

I claim:

1. A knife-edge bearing arrangement for measuring instruments, comprising a rotatable arbor providing two bearing points, each bearing point including two knife-edges angularly displaced relative to each other, two supporting faces each coacting with one of the knife-edges, said two supporting faces being so positioned relatively to the knife-edges that the contacting lines of both knife-edges with said faces are in alignment one with another and situated in the axis of rotation of said arbor, and spring means operatively connected with said arbor to allow free rotation of the arbor and to urge both of said knife-edges against their respective supporting faces, whereby said bearing arrangement is operative in any position of said instrument.

2. A knife-edge bearing arrangement for measuring instruments, comprising a rotatable arbor, providing two bearing points, each bearing point including two knife-edges angularly displaced relative to each other, two supporting faces each coacting with one of the knife-edges, said two supporting faces being so positioned relatively to the knife-edges that the contacting lines of both knife-edges with said faces are in alignment one with another and situated in the axis of rotation of said arbor, rings encircling said arbor, and tension springs each connected to one of said rings, to allow free rotation of the arbor and to urge both of said knife-edges against their respective supporting faces, whereby said bearing arrangement is operative in any position of said instrument.

DANIEL ERNST.

REFERENCES CITED

The following references are of record in the file of this patent:

UNITED STATES PATENTS

| Number | Name | Date |
|---|---|---|
| 1,012,641 | Hopkinson | Dec. 26, 1911 |
| 1,687,894 | Ruggles | Oct. 16, 1928 |
| 1,765,584 | Henderson | June 24, 1930 |
| 2,021,061 | Hedman | Nov. 12, 1935 |